(12) United States Patent
Choi et al.

(10) Patent No.: US 8,904,546 B2
(45) Date of Patent: Dec. 2, 2014

(54) DIGITAL RIGHTS MANAGEMENT METHOD AND DIGITAL RIGHTS MANAGEMENT-ENABLED PORTABLE DEVICE

(75) Inventors: Tae Hwa Choi, Seosan-si (KR); Kyung Keun Lee, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1602 days.

(21) Appl. No.: 12/082,937

(22) Filed: Apr. 15, 2008

(65) Prior Publication Data

US 2008/0256645 A1    Oct. 16, 2008

(30) Foreign Application Priority Data

Apr. 16, 2007    (KR) .................. 10-2007-0037102

(51) Int. Cl.
| | |
|---|---|
| G06F 21/00 | (2013.01) |
| G06F 21/62 | (2013.01) |
| H04L 29/06 | (2006.01) |
| G06F 21/10 | (2013.01) |

(52) U.S. Cl.
CPC ............ G06F 21/10 (2013.01); G06F 21/6218 (2013.01); *G06F 2221/0775* (2013.01); *H04L 2463/101* (2013.01); H04L 63/0428 (2013.01)
USPC ............... 726/27; 380/44; 713/176; 713/193; 705/57; 455/403; 455/422

(58) Field of Classification Search
CPC . G06F 21/10; G06F 2221/0775; G06F 21/86; G06F 2221/2153; G06F 21/6128; G06Q 30/06; G11B 20/00086; H04L 2463/101; H04L 63/0428

USPC .......................................................... 726/27
See application file for complete search history.

(56) References Cited

U.S. PATENT DOCUMENTS

| | | | |
|---|---|---|---|
| 7,152,166 B2 | 12/2006 | Strom et al. | ................... 713/193 |
| 7,340,609 B2 * | 3/2008 | Haneda et al. | ................ 713/176 |

(Continued)

FOREIGN PATENT DOCUMENTS

| | | | |
|---|---|---|---|
| EP | 1571556 | 9/2005 | .............. G06F 12/14 |
| KR | 2005-62829 | 6/2005 | ................ H04L 9/32 |

(Continued)

OTHER PUBLICATIONS

Lu, Qiong, Reihaneh Safavi-Naini, and Nicholas Paul Sheppard. "Digital Rights Management for Content Distribution." Australian Information Security Workshop, 2003.*

*Primary Examiner* — Thanhnga B Truong
*Assistant Examiner* — Narciso Victoria
(74) *Attorney, Agent, or Firm* — Cha & Reiter, LLC

(57) ABSTRACT

A DRM method and DRM-enabled portable device for controlling playback of DRM content on the basis of content usage log is disclosed. A digital rights management method for a portable device of the present invention includes playing a content item recording, when an abnormal playback stop event is detected, a stop time point in a playback session of the content item on a usage log and controlling a next playback of the content item with reference to the recorded stop time point. The DRM method and DRM-enabled portable device of the present invention further manages the licenses issued for the DRM content stored in the portable device by updating the licenses even when the DRM content are abnormally closed during its playback session.

17 Claims, 4 Drawing Sheets

(56) References Cited

U.S. PATENT DOCUMENTS

| | | | |
|---|---|---|---|
| 7,809,992 B2 * | 10/2010 | Kulidjian et al. | 714/47.1 |
| 2002/0019814 A1 * | 2/2002 | Ganesan | 705/59 |
| 2002/0065074 A1 * | 5/2002 | Cohn et al. | 455/422 |
| 2004/0102987 A1 * | 5/2004 | Takahashi et al. | 705/1 |
| 2005/0114896 A1 * | 5/2005 | Hug et al. | 725/88 |
| 2006/0069650 A1 * | 3/2006 | Hori | 705/57 |
| 2006/0248115 A1 | 11/2006 | Schmidt et al. | |

FOREIGN PATENT DOCUMENTS

| | | | |
|---|---|---|---|
| KR | 2006-65107 | 6/2006 | H04B 1/40 |
| KR | 2006-116255 | 11/2006 | G06F 17/00 |
| KR | 2006-119021 | 11/2006 | H04B 1/40 |

* cited by examiner

| FILE NAME | FILE TYPE | ELAPSED TIME |
|-----------|-----------|--------------|
| Yoonpat | Wmp | 01' 12" |
| ⋮ | ⋮ | ⋮ |

DIGITAL RIGHTS MANAGEMENT METHOD AND DIGITAL RIGHTS MANAGEMENT-ENABLED PORTABLE DEVICE

CLAIMS OF PRIORITY

This application claims the benefit of the earlier filing data, pursuant to 35 USC 119, to that patent application entitled "DIGITAL RIGHTS MANAGEMENT METHOD AND DIGITAL RIGHTS MANAGEMENT-ENABLED PORTABLE DEVICE," filed in the Korean Intellectual Property Office on Apr. 16, 2007 and assigned Serial No. 2007-0037102, the contents of which are incorporated herein by reference.

BACKGROUND OF THE INVENTION

1. Field of the Invention

The present invention relates to a digital rights management (DRM) and, in particular, to a DRM method and DRM-enabled portable device for controlling playbacks of DRM contents on the basis of content usage log.

2. Description of the Related Art

Digital Rights Management (DRM) is an access control technologies to protect the intellectual property of the distributed digital media by limiting usage of digital media using encryption techniques. That is, DRM technology allows securely transmitting content from a Content Provider (CP) to a user and protecting the contents from being illegally used and distributed.

DRM technologies attempt to control the digital content through all the phases of creation, distribution, use, abrogation; and access to protect rights of the owner of the digital content in online and even offline states.

In order to use a DRM content item on a mobile device, a user accesses a content server providing DRM content and downloads the DRM content item together with its metadata and license using the mobile device. Here, the metadata contains information regarding the DRM content item and the license contains information regarding a key for decrypting the encrypted DRM content item and associated usage right (e.g., amount of usage time and period).

After downloading the DRM content item and its metadata and license, the user can use the DRM content item in the usage range specified in the license.

Conventionally, the license associated with a DRM content item is updated when it is completely played. For example, if a DRM content item having a license allowing up to 100 times of playback is completely played once, the license on the DRM content item is updated such that the valid playback times of the DRM content item is decreased by 1 to become 99. However, the conventional license update mechanism has a drawback in that the license update fails when the currently playing DRM content item is abnormally stopped, e.g. by battery power shortage, whereby this vulnerable characteristic is likely to be used malevolently.

SUMMARY OF THE INVENTION

The present invention provides a digital rights management (DRM) method and system that is capable of managing licenses of DRM content using content-specific usage log.

In accordance with an exemplary embodiment of the present invention, a digital rights management method for a portable device includes playing a content item, recording, when an abnormal playback stop event is detected, a stop time point in a playback session of the content item on a usage log, and controlling a next playback of the content item with reference to the stop time point.

In accordance with another exemplary embodiment of the present invention, a digital rights management (DRM) method for a portable device includes playing a DRM content item, updating an elapsed playback time of the DRM content item periodically, the elapsed playback time being recorded on a usage log and controlling, when an abnormal playback stop event is detected, a next playback of the DRM content item to start from the elapsed playback time.

In accordance with another exemplary embodiment of the present invention, a method for playing a digital rights management (DRM) protected content item for a portable device includes playing a DRM content item; recording an elapsed playback time of the DRM content item periodically, the elapsed playback time being recorded on a usage log, generating a key value by encrypting the usage log using a predetermined encryption algorithm, checking, when an abnormal playback stop event is detected, whether the usage log exists and controlling a next playback of the DRM content item according to whether the usage log exists.

In accordance with another exemplary embodiment of the present invention, a digital rights management (DRM)-enabled portable device includes a memory for storing DRM content items, a player for playing the DRM content items, and a controller for generating, when a DRM content item stops abnormally during a playback session, a usage log for recording a stop time point of the DRM content item, and controlling a next playback of the DRM content item with reference to the usage log.

In accordance with another exemplary embodiment of the present invention, a digital rights management (DRM)-enabled portable device includes a memory for storing DRM content items, a player for playing the DRM content items, and a controller for updating an elapsed time point of a playback of one of the DRM content items periodically and controlling, when the playback is stopped abnormally, a next playback with reference to a usage log which records the elapsed time point.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Now, embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

While the present invention is able to be embodied in many different forms, specific embodiments thereof are shown in drawings and described herein in detail, with the understanding that the present disclosure is to be considered as an exemplification of the principles of the invention and is not intended to limit the invention to the specific embodiments illustrated.

In the following, how to control playback of a DRM content item in the DRM method and DRM-enabled device is described. By controlling the playbacks of the DRM content item on the basis of a content-specific usage log, the license of the DRM content item can be normally updated even when the currently-playing DRM content item is stopped abnormally.

In the following, the portable device, represents a DRM-enabled devices including personal digital assistants (PDAs), smart phones, MP3 Players, laptop computers, personal computers, digital cameras, cellular phones, personal communication service (PCS) phones, dedicated DMB receivers, International Mobile Telecommunication 2000 (IMT-2000) terminals, Universal Mobile Telecommunication Service (UMTS) terminals, and their equivalents. In the following embodiments, it is assumed that the DRM-enabled portable device is a mobile phone. However, the principles described herein are applicable to similar portable devices.

Figure 1:
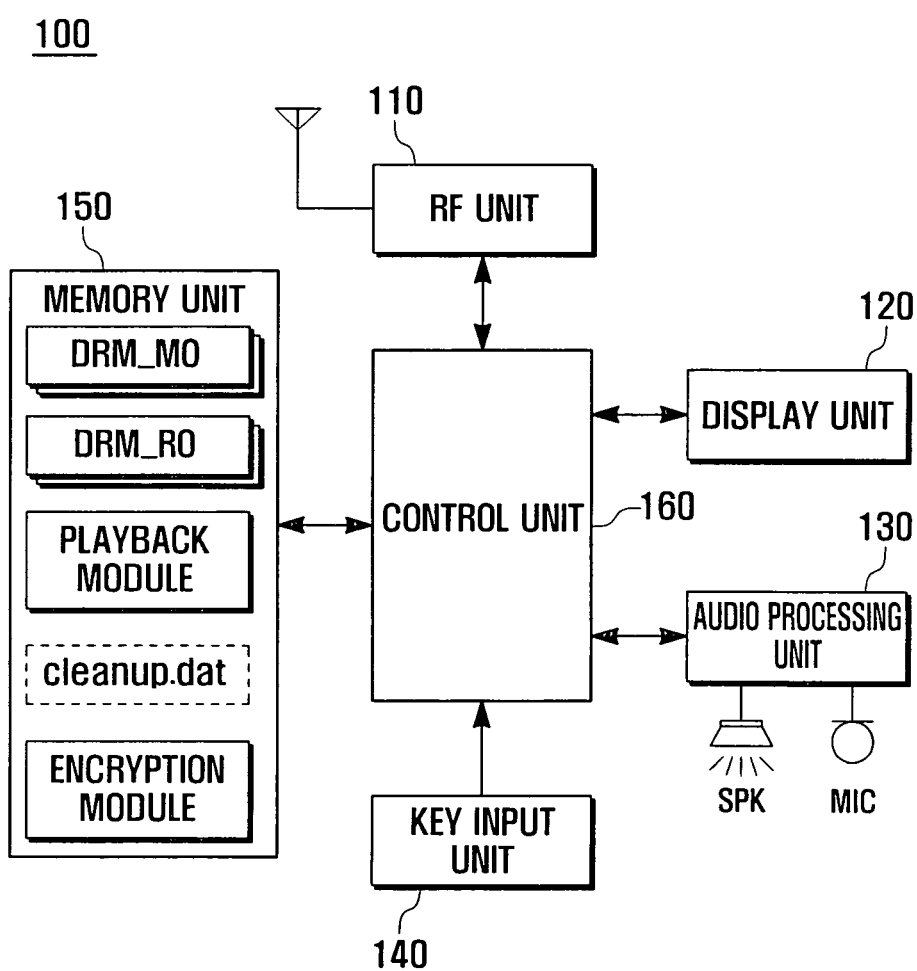
FIG. 1 is a block diagram illustrating a configuration of a DRM-enabled mobile phone according to an exemplary embodiment of the present invention.

FIG. 1 is a block diagram illustrating a configuration of a DRM-enabled mobile phone according to an exemplary embodiment of the present invention.

Referring to FIG. 1, the DRM-enabled mobile phone 100 includes a memory unit 150, a display unit 120, an audio processing unit 130, a key input unit 140, a control unit 160, and a radio frequency unit 110.

The memory unit 150 stores application programs required for operating the DRM-enabled mobile phone 1, DRM contents (DRM_MO), licenses (DRM_RO) issued for the DRM contents, and user data input by a user. In a case that the DRM content (DRM_RO) are provide in the form of a streaming service, the memory unit 150 is responsible for buffering the stream of the DRM content (DRM_RO) by a predetermined size. The memory unit 150 also stores a usage log (cleanup.dat) of the DRM contents for updating the license (DRM_RO) when a currently-playing DRM content item is stopped abnormally. The memory unit 150 can be divided into a program region and a data region.

The program region of the memory unit 150 stores an operation system (OS) for controlling basic tasks of the DRM-enabled mobile phone and applications required for playing the DRM content (DRM_MO). The program region also stores applications for executing other optional functions of the DRM-enabled mobile phone such as camera function, sound playback function, and still and motion picture playback reproducing function. The program region may be provided with an encryption module for securing the integrity of the usage log (cleanup.dat). The DRM-enable mobile phone 100 loads specific application(s) in response to a user request and executes a function supported by the application(s) under the control of the control unit 160.

The data region of the memory unit 150 stores the application data generated while the mobile phone 100 operating with the application programs, DRM content (DRM_MO) and licenses (DRM_RO) issued for the DRM content. The data region also stores the user data input in association with the optional functions and user information. For example, the user data may include still and motion images taken by the camera, phonebook data, audio data, other contents, and information associated with the user data.

The display unit 120 displays various menu screens associated with the operations of the mobile phone 100 and information input by the user. The display unit can be implemented with a liquid crystal display (LCD). In a preferred embodiment the LCD may include a touchscreen functionality. In this case, the display unit 120 acts as an input means. Particularly, the display unit 120 is configured to display both the downloaded non-streaming DRM content (DRM_MO) and streaming DRM content (DRM_MO). The display unit 120 can be configured such that when a currently-playing DRM content item is abnormally stopped, the display unit 120 displays a pop-up window for notifying the user of updating the license (DRM_RO) of the DRM content item (DRM_MO). Also, the mobile phone 100 can be configured such that the display unit 120 maintains displaying the license update alert, when the currently-playing DRM content (DRM_MO) is stopped by the battery power shortage, by using an auxiliary power.

The audio processing unit 130 processes audio data of the DRM content item (DRM_MO) and output the audio data through a speaker (SPK) in the form of an audible sound wave and transfers audio signals input through a microphone (MIC) to the control unit 160. In this embodiment, the audio processing unit 130 is configured to output a license update alert in the form of a voice announcement when the currently-playing DRM content item is abnormally stopped.

The key input unit 140 is provided with a plurality of alphanumeric keys for receiving user input and a plurality of functions keys for executing respective functions. The function keys can be implemented in the form of separately prepared navigation key, side keys, and shortcut keys configured in a specific manipulation pattern. The key input unit 140 transfers the key signals input in association with user configuration and control of the mobile phone 100 to the control unit 160. Particularly, the key input unit 140 receives the key inputs for controlling playback of a DRM content item such as "play," "pause," "stop," "fast forward (FF)," "rewind (REW)," and "record." Particularly, the key input unit 140 is provided with a power key to trigger booting the mobile phone 100 under the control of the control unit 160.

The RF unit 110 is responsible for RF communication so as to support voice communication, access to a DRM content by means of wireless access protocol (WAP), and data communication with the DRM contents server for downloading the DRM content (DRM_MO) and licenses (DRM_RO). In order to support the RF communication, the RF unit 110 is provided with an RF transmitter for up-converting and amplifying transmission signals and an RF receiver for low-noise amplifying and down-converting the received signals.

The control unit 160 controls general operations of the mobile phone 100 and cooperative signaling among the internal components of the mobile phone 100. The control unit 160 may be provided with functionalities of modem and codec.

In the case that the DRM-enabled mobile phone 100 operates in a communication mode, the RF unit 110 is configured to control operations associated with voice and data communications. The control unit 160 performs data management operations such as reading, modifying, deleting, and combining the data stored in the memory unit 150. The control unit 160 can control playback of a DRM content item (DRM_MO) stored in the memory unit 150 with reference to the corresponding license (DRM_RO) in response to the key signal input by user's key manipulation. When the currently-playing DRM content item (DRM_MO) stops playing, the control unit 160 operates such that the license (DRM_RO) of the DRM content item (DRM_MO) is updated. At this time, the control unit 160 operates such that an update alert message for indicating the update of the license (DRM_RO) is output through at least one the display unit 120 and the audio processing unit 130.

Figures 2, 3:
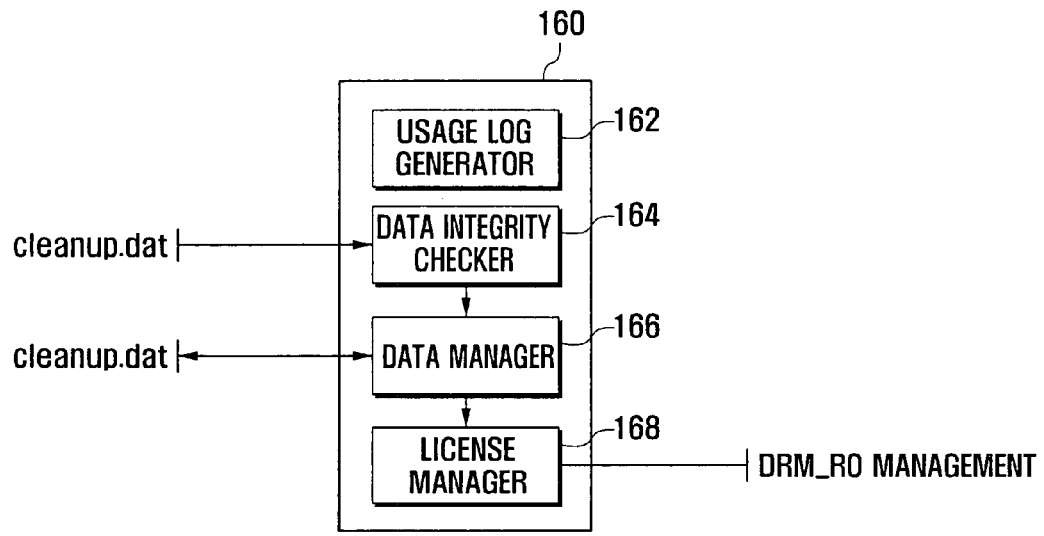
FIG. 2 is a block diagram illustrating a configuration of the control unit of FIG. 1.
FIG. 3 is a diagram illustrating a structure of the usage log file used in the DRM-enabled mobile phone of FIG. 1.

FIG. 2 is a block diagram illustrating a configuration of the control unit of FIG. 1.

Referring to FIG. 2, the control unit 160 includes a usage log generator 162, a data integrity checker 164, a data manager 166, and a license manager 168.

The usage log generator 162 generates a usage log file (cleanup.dat) of DRM content items (DRM_MO). The usage log file records playback history of the DRM content (DRM_MO). The usage log generators 162 stores the usage log files within the memory unit 150. In a case that a plurality of DRM content (DRM_MO) is managed, the usage log generator 162 manages the DRM content with a DRM content list. For example, a DRM audio file and a DRM video file are played, the usage log generator 162 registers the DRM audio and video files to the DRM content list and records the playback information on the DRM contents in the usage log file (cleanup.dat).

The data integrity checker 164 checks the integrity of the usage log file (cleanup.dat) generated by the usage log generator 162. That is, the data integrity checker 164 encrypts the usage log file (cleanup.dat) using an encryption module stored in the memory unit 150. At this time, the encryption module can apply an electric signature encryption using a public key structure and apply a MAC encryption using a message authentication code (MAC) algorithm to the usage log file (clean.dat). Here, the data integrity checker 164 generates and stores a private key for the public key structure-based electric signature. In a case of application to the MAC algorithm, the data integrity checker 164 generates and stores a symmetric key. The data integrity checker 164 stores the public key and symmetric key within a region which restricts an access by a specific user. The encryption module can be provided with various algorithm as well as the public key-based asymmetric encryption algorithm and MAC-based symmetric encryption algorithm. The data integrity checker 164 can encrypt the usage log file (cleanup.dat) using various encryption algorithms provided with the encryption module in a mixed or repeated manner. The data integrity checker 164 also checks the integrity of the encrypted usage log file (cleanup.dat). That is, the data integrity checker 164 checks the modification and deletion of the usage log file (cleanup.dat) and reports the checking result to the control unit 160.

The data manager 166 manages application and deletion of the usage log file (cleanup.dat). That is, when the DRM content items (DRM_MOs) are normally closed, the data manager 166 deletes the DRM content items (DRM_MOs) that are normally closed from the usage log file (cleanup.dat). Meanwhile, if the usage log file (cleanup.dat) has no DRM content item, the data manager 166 may delete the usage log file (cleanup.dat). In a case that the usage log file (cleanup.dat) has DRM content items that are closed or stopped abnormally, the data manager 166 reports the DRM content items to the license manager 168 by means of the usage log file (cleanup.dat).

The license manager 168 updates the licenses (DRM_ROs) of the abnormally closed DRM content items (DRM_MOs) that are reported by the data manager 166. Accordingly, when the mobile phone 100 is rebooted after being abnormally closed, the license manager 168 retrieves the licenses (DRM_ROs) corresponding to the DRM content items (DRM_MOs) from the memory unit 150 and updates the retrieved licenses (DRM_ROs). Here, the license update is performed by reducing the remained playback times or period of the corresponding DRM content item (DRM_MO).

The license manager 168 can control the playback of the DRM content item (DRM_MO) with reference to the usage log file (cleanup.dat) received from the data manager 166. In more detail, the license manager 168 can check the elapsed time of a playback session of each DRM content item from the usage log file (cleanup.dat) and controls such that the DRM content item (DRM_MO) is played from the elapsed time of the playback session at the next playback. In a case that the elapsed time recorded in the usage log file is less than a predetermined duration, the license (DRM_RO) of the DRM content item (DRM_MO) is not updated. Otherwise, the license (DRM_RO) is updated.

FIG. 3 is a diagram illustrating a structure of the usage log file used in the DRM-enabled mobile phone of FIG. 1.

Referring to FIG. 3, the usage log file (cleanup.dat) is implemented in the form of a table including file name, file type, and elapsed time fields. The file name field is provided for listing file names of the DRM content items (DRM_MOs) registered in the usage log file (cleanup.dat). The file type field indicates the types of the corresponding DRM content items (DRM_MOs) such as audio file type, video file type, and text file type. The file type field may not be filled out. The elapsed time field indicates an elapsed time in the playback session of a DRM content item (DRM_MO). The elapsed time of each DRM content item can be updated periodically during the playback of the DRM content item. The elapsed time is updated when the DRM content item is abnormally closed. The control unit 160 operates to reserve the auxiliary power and records, when the currently-playing DRM content item is abnormally stopped, the time elapsed from the start of the playback of the DRM content item in the elapsed time field of the DRM content item. The usage log file (cleanup.dat) is used for controlling the playbacks of the DRM content items (DRM_MOs). As described above, the license manager 168 checks the elapsed time field of the DRM content item (DRM_MO) listed in the usage log file (cleanup.dat) and controls the playback of the DRM content item with reference to the elapsed time.

Operations of the above structured DRM-enabled mobile phone are described hereinafter. Particularly, a DRM method is described with focusing on how to create and use the usage log file.

Figure 4:
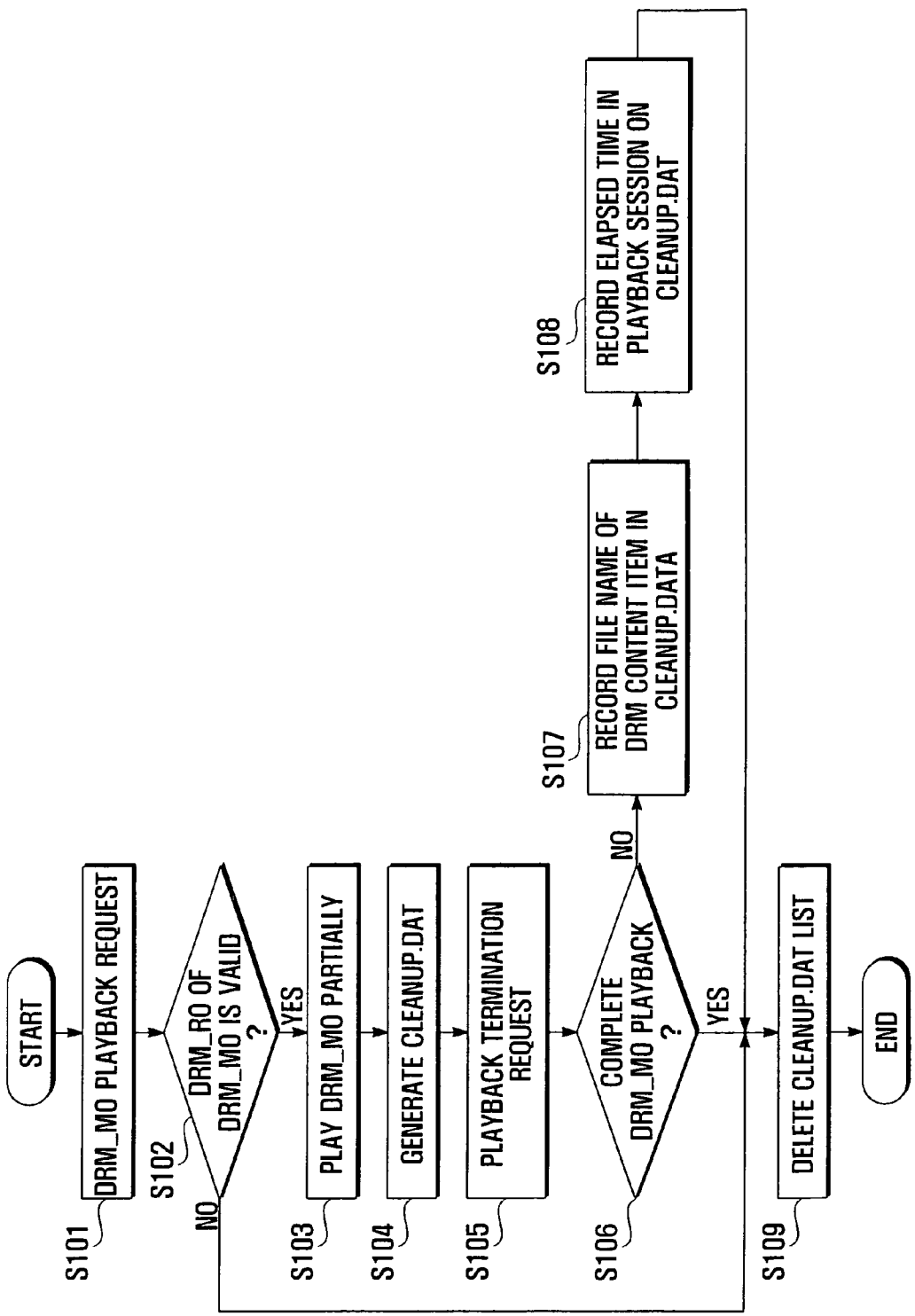
FIG. 4 is a flowchart illustrating usage log file generation procedure of a DRM method according to an exemplary embodiment of the present invention.

FIG. 4 is a flowchart illustrating usage log file generation procedure of a DRM method according to an exemplary embodiment of the present invention.

Referring to FIG. 4, the control unit 160 detects a key input for requesting a playback of a specific DRM content item (DRM_MO) (S101). When the playback request key input is detected, the control unit 160 checks the validity of a license (DRM_RO) of the requested DRM content item (DRM_MO) (S102). In response to the playback request key input, the control unit 160 loads the DRM content item (DRM_MO) on the memory unit 150 and checks whether the DRM content item requires a license for playback. In a case that the DRM content item requires a license, the control unit 160 searches for the license. For this purpose, license indexes of the DRM content items are preferably stored within the memory unit 150 in the form of an index table. Here, the validity of the license is an availability of usage right issued for the DRM content item. That is, in a case that the license (DRM_RO) is of a restricted usage period, the license having a remaining usage period is valid. In a case that the license (DRM_RO) is a restricted playback including a number of times of playback of the DRM content item (DRM_MO), the license having a count value not equal to "zero" is valid.

If it is determined that the license (DRM_RO) of the DRM content item (DRM_MO) is valid, the control unit 160 plays the DRM content item entirely or partially (S103). In a case that the DRM content item (DRM_MO) is encrypted, the control unit 160 decrypts and plays the DRM content item of a predetermined length. The control unit 160 also can decrypt the entire DRM content item (DRM_MO) at this time and play the decrypted DRM content item (DRM_MO) continuously. Next, the control unit 160 generates a usage log file (cleanup.dat) (DRM_MO) and stores the usage log file (cleanup.dat) within the memory unit (S104). The usage log file (cleanup.dat) is generated when the DRM content item (DRM_MO) starts playing. If the playback of the DRM content item (DRM_MO) stops abnormally, the file name and elapsed time of the playback session are recorded in the usage log file (cleanup.dat).

If a playback stop event is detected (S105) while playing the DRM content item (DRM_MO) and a determination is made whether the playback stop event occurred by the completion of the playback session of the DRM content item (DRM_MO) (S106). The playback stop event can occur when the playback session is finished or a playback stop key is input on the key input unit 140. The playback stop event also occurs when the power supply is blocked. Accordingly, the control unit 160 analyzes the cause of the playback stop event at step S106.

If it is determined that the playback stop event occurred before completion of the playback session, the control unit 160 records the file name of the DRM content item (DRM_MO) in the usage log file (creanup.dat) (S107). Next, the control unit 160 updates the elapsed time in the playback session of the DRM content item (DRM_MO) (S108). Here, the control unit 160 can acquire the elapsed time of the playback session from the DRM content playback module.

Meanwhile, if it is determined that the playback stop event occurred by the completion of the playback session, the control unit 160 deletes the usage log file (cleanup.dat) (S109).

As described above, in the usage log file generation procedure of the DRM method according to an embodiment of the present invention, the usage log file is used for recording the time when the playback of the DRM content item is stopped before completion. Here, the step S109 can be modified such that the DRM content item is deleted from the usage log file (cleanup.dat) rather than the deletion of the usage log file (cleanup.dat) itself. However, it is preferred to delete the usage log file (cleanup.dat) for efficient memory resource management.

In the usage log generation procedure, the control unit 160 may update of the elapsed time of the playback session periodically. That is, the control unit 160 can update the usage log file (cleanup.dat) using a different method rather than a user request-based update method. For example, the control unit 160 may periodically update the elapsed time of the playback session of the DRM content item (DRM_MO) and use the elapsed time right before the DRM content item is stopped. In this case there is no need to provide an auxiliary power and this mechanism can be available when the system power of the mobile phone is not available.

Figure 5:
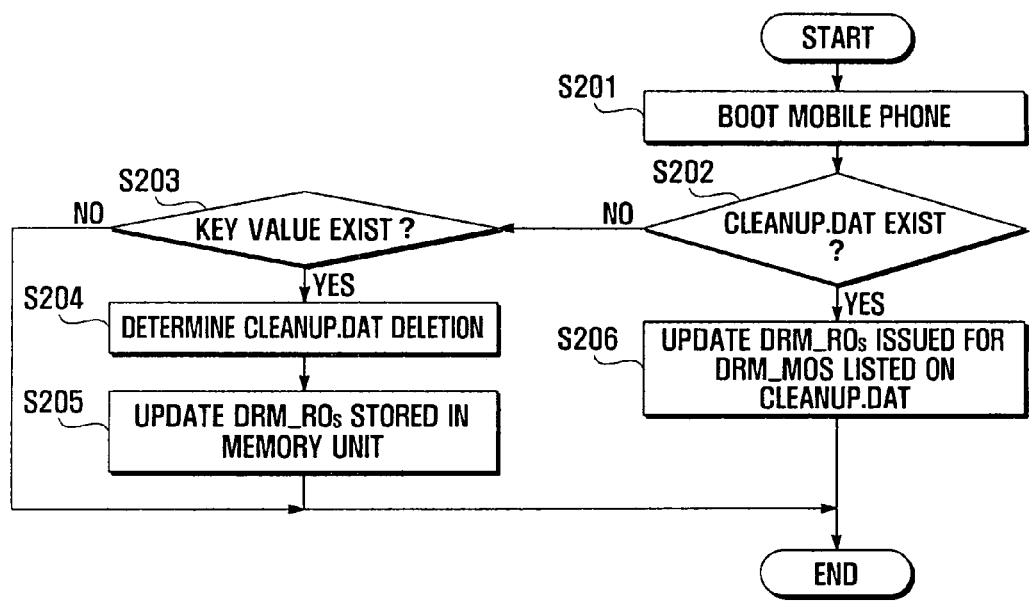
FIG. 5 is a block diagram illustrating a usage log file utilization procedure of the DRM method according to an exemplary embodiment of the present invention.

FIG. 5 is a block diagram illustrating a usage log file utilization procedure of the DRM method according to an exemplary embodiment of the present invention.

In the following, it is assumed that the usage log file (cleanup.dat) is generated as illustrated in FIG. 4. The usage log file utilization procedure of the DRM method is described in association with a case that a DRM content item is abnormally closed or stopped while being played by the mobile terminal.

Referring to FIG. 5, the mobile phone 100 boots up in response to the power-on key input (S201). At this time, the control unit 160 loads the operation system of the mobile phone 100 on the memory unit 150 such that the mobile phone 100 is prepared to operate in accordance with the processing of the operation system contained therein. After the mobile phone 100 boots up successfully, the control unit 160 activates basic application programs and controls the mobile terminal 100 to enter an idle state.

Next, the control unit 160 checks whether a usage log file (cleanup.dat) exists in the memory unit 150 (S202). If no usage log file exists, the control unit 160 checks whether any key value is registered for calling a usage log file (S203). A key value is correspondingly generated when a usage log file is created. The key value is generated by the encryption module of the data integrity checker 164 of the control unit 160. In a case where the encryption module uses the electric signature algorithm, the key value is of a private key. In a case where the encryption module uses MAC algorithm, the key value is of a symmetric key. If a key value exist, the data integrity checker 164 judges that the usage log file (cleanup.dat) is deleted (S204) and updates licenses (DRM_ROs) at least one DRM content item (DRM_MO) stored in the memory unit 150 (S205). Here, the update of the license (DRM_RF) of the DRM content item (DRM_MO) is performed by reducing a value of the playback count constraint. That is, the control unit 160 may reduce the available playback time or period assigned to the license (DRM_RO) during the update. The control unit 160 may apply a penalty to the deletion of the usage log file (cleanup.dat) higher than to an abnormal closure of the currently-playing DRM content item. In the case that the usage log file (cleanup.dat) is deleted, the control unit 160 may classify the user as a malevolent user and thus perform update or expiration of all the licenses (DRM_RO) stored in the memory unit 150.

In a case that there is no key value at step S203, the control unit 160 ends the usage file utilization procedure of the DRM method. Returning to step S202, if a usage log file (cleanup.dat) exists, the control unit 160 checks the DRM content items listed in the usage log file (cleanup.dat) and updates the corresponding licenses (DRM_RO) of the DRM content items listed on the usage log file (S206). In order to update the licenses, the control unit 160 can retrieve the licenses (DRM_ROs) associated with the DRM content items (DRM_MOs) from the memory unit 150.

Although the usage log-based DRM method according to this embodiment updates the licenses (DRM_ROs) of the DRM content items (DRM_MOs) of which playback rights have not expired, the present invention is not limited thereto. For example, the control unit 160 can control the playback of a DRM content item (DRM_MO) having a license (DRM_RO) with unexpired playback right to start from a time point recorded in the usage log file (cleanup.dat). The playback control mechanism of the DRM method can be modified according to the configuration of the mobile phone 100.

As described above, the usage log-based DRM method and DRM-enabled portable device of the present invention can manage the licenses (DRM_ROs) issued for the DRM content items (DRM_MOs) even when the DRM content items (DRM_MOs) are abnormally stopped or closed.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the DRM method and DRM-enabled portable device of the present invention can manage the licenses issued for the DRM contents stored in the portable device by updating the licenses even when the DRM contents are closed during its playback session.

What is claimed is:

1. A digital rights management (DRM) method for a portable device, comprising:
    creating, when a DRM content starts, a usage log of the DRM content including elapsed playback time;
    determining, when a playback stop event is detected, whether the playback stop event occurs before completion of the playback of the DRM content; and
    recording, when the playback stop event occurs before completion of the playback of the DRM content, the usage log of the DRM content, so that a license issued for the DRM content is updated according to the usage log of the DRM content;
    notifying, when the playback stop event occurs before completion of the playback of the DRM content, an updating of the license of the DRM content by displaying a pop-up screen,
    wherein the usage log is encrypted for maintaining data integrity.

2. The digital rights management method of claim 1, wherein the playback stop event occurs by one of the completion of the playback, a request for stopping the playback and abnormal stop, the abnormal stop comprising at least one of a termination of power to the portable device and a power-off key input.

3. The digital rights management method of claim 1, wherein recording the usage log comprises:
    activating auxiliary power of the portable device; and
    recording the usage log according to the usage log by using the auxiliary power.

4. The digital rights management method of claim 1, further comprising:
    determining whether a usage log of at least one DRM content exists;
    updating, when the usage log of at least one DRM content exists, at least one license issued for the at least one DRM content according to the usage log.

5. The digital rights management method of claim 4, wherein updating comprises:
    reducing at least one of an available playback time and a count of available playback times specified in the license.

6. The digital rights management method of claim 1, further comprising:
    deleting, when the playback stop event occurs by completion of the playback of the DRM content, the usage log of the DRM content; and
    updating the license.

7. The digital rights management method of claim 6, wherein updating the license comprises:
    determining whether the elapsed playback time is less than a predetermined duration; and
    updating, if the elapsed playback time is not less than a predetermined duration, the license.

8. The digital rights management method of claim 1 further comprising:
    playing, when a request for a playback of the DRM content is detected, the DRM content from the elapsed playback time of the usage log.

9. The digital rights management method of claim 1, wherein creating the usage log of the DRM content comprises:
    updating the elapsed playback time periodically.

10. The digital rights management method of claim 1, wherein the recording the usage log of the DRM content comprising:
    generating a key value by encrypting the usage log using a predetermined encryption algorithm.

11. The digital rights management method of claim 1, wherein the playback stop event occurs by one of the completion of the playback, a request for stopping the playback and abnormal stop, the abnormal stop comprising at least one of a termination of power to the portable device and a power-off key input.

12. The digital rights management method of claim 1 further comprising:
    determining whether a usage log of at least one DRM content exists;
    updating, when the usage log of at least one DRM content exists, at least one license issued for the at least one DRM content according to the usage log.

13. The digital rights management method of claim 1 further comprising:
    deleting, when the playback stop event occurs by completion of the playback of the DRM content, the usage log of the DRM content; and
    updating the license.

14. A digital rights management (DRM)-enabled portable device comprising:
    a memory for storing at least one DRM content item and at least one license issued for the at least one DRM content; and
    a controller for creating, when the DRM content starts, a usage log of the DRM content including elapsed playback time, determining, when a playback stop event is detected, whether the playback stop event occurs before completion of the playback of the DRM content, recording, when the playback stop event occurs before completion of the playback of the DRM content, the usage log of the DRM content in the memory, so that the license is updated according to the usage log of the DRM content, and notifying, when the playback stop event occurs before completion of the playback of the DRM content, an updating of the license of the DRM content by displaying a pop-up screen,
    wherein the usage log is encrypted for maintaining data integrity.

15. A digital rights management (DRM)-enabled portable device comprising:
    a memory for storing at least one DRM content item and at least one license issued for the at least one DRM content; and
    a controller for creating, when the DRM content starts, a usage log of the DRM content including elapsed playback time, determining, when a playback stop event is detected, whether the playback stop event occurs before completion of the playback of the DRM content, and recording, when the playback stop event occurs before completion of the playback of the DRM content, the usage log of the DRM content in the memory, so that the license is updated according to the usage log of the DRM content;

wherein the controller comprises:

a usage log generator for generating the usage log;

a data manager for managing data of the DRM content item such as file name and the elapsed playback time of the DRM content item;

a license manager for managing update of the license; and a data integrity checker for maintaining data integrity by encrypting the usage log, wherein the data integrity checker checks whether the usage log is deleted and imposes a penalty when the usage log is deleted.

16. The DRM-enabled portable device of claim 15, wherein the controller updates the at least one DRM content item by at least one of: reducing an available playback time specified in the at least one license and reducing a count of available playback times by one.

17. A digital rights management (DRM) method for a portable device, comprising:

creating, when a DRM content starts, a usage log of the DRM content including elapsed playback time;

determining, when a playback stop event is detected, whether the playback stop event occurs before completion of the playback of the DRM content;

recording, when the playback stop event occurs before completion of the playback of the DRM content, the usage log of the DRM content, so that a license issued for the DRM content is updated according to the usage log of the DRM content; and notifying, when the playback stop event occurs before completion of the playback of the DRM content, an updating of the license of the DRM content by displaying a pop-up screen, wherein the usage log is encrypted for maintaining data integrity.

\* \* \* \* \*